(12) United States Patent
Saltsidis

(10) Patent No.: US 9,124,468 B2
(45) Date of Patent: *Sep. 1, 2015

(54) CONTROL FRAME HANDLING BY A PROVIDER BACKBONE BRIDGE

(71) Applicant: TELEFONAKTIEBOLAGET L M ERICSSON (PUBL), Stockholm (SE)

(72) Inventor: Panagiotis Saltsidis, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 197 days.

This patent is subject to a terminal disclaimer.

(21) Appl. No.: 13/856,576

(22) Filed: Apr. 4, 2013

(65) Prior Publication Data

US 2013/0201872 A1 Aug. 8, 2013

Related U.S. Application Data

(63) Continuation of application No. 13/233,110, filed on Sep. 15, 2011, now Pat. No. 8,437,279, which is a continuation of application No. 12/440,868, filed as application No. PCT/IB2007/003992 on Dec. 18, 2007, now Pat. No. 8,036,142.

(60) Provisional application No. 60/884,817, filed on Jan. 12, 2007.

(51) Int. Cl.
*H04L 12/28* (2006.01)
*H04L 29/06* (2006.01)
*C04B 28/02* (2006.01)
*C04B 40/00* (2006.01)
(Continued)

(52) U.S. Cl.
CPC .......... *H04L 29/06163* (2013.01); *C04B 28/02* (2013.01); *C04B 40/0039* (2013.01); *H04L 69/18* (2013.01); *C04B 2103/52* (2013.01); *C04B 2111/1081* (2013.01)

(58) Field of Classification Search
CPC .................................................. H04L 12/4662
See application file for complete search history.

(56) References Cited

U.S. PATENT DOCUMENTS

| 7,113,487 B1 | 9/2006 | Johnson |
| 2007/0086361 A1 | 4/2007 | Allan |

(Continued)

OTHER PUBLICATIONS

Bottorff, P., S. Haddock, A. Sajassi, M. Suzuki, M. Seaman; "IEEE P302.1ah/D3.3—Virtual Bridged Local Area Network—Amendment 6: Provider Backbone Bridges," Interworking Task Group of IEEE 802.1, Dec. 2006.

(Continued)

*Primary Examiner* — Gregory Sefcheck
*Assistant Examiner* — Suk Jin Kang

(57) ABSTRACT

A method, Bridge, and system in a Provider Backbone Bridge Network (PBBN) for enabling frames from a Higher Layer Entity attached alternatively to a Provider Instance Port (PIP) on an I-Component of a Backbone Edge Bridge or to a Customer Backbone Port on a B-Component of the Backbone Edge Bridge, to reach an intended entity in the PBBN. A Multiplexed Service Access Point (SAP) of a Service Instance Multiplex Entity handles the frames of the Higher Layer Entity, and is assigned a Service Instance ID (I-SID) value that is universally recognized to identify Layer 2 Control Protocols. The Service Instance Multiplex Entity utilizes the Multiplexed SAP to transfer frames between the PIP or the Customer Backbone Port and the entity in the PBBN.

20 Claims, 2 Drawing Sheets

(51) Int. Cl.
　　*C04B 103/52*　　(2006.01)
　　*C04B 111/10*　　(2006.01)

(56) References Cited

U.S. PATENT DOCUMENTS

| | | |
|---|---|---|
| 2007/0116045 A1 | 5/2007 | Mohan |
| 2008/0019385 A1 | 1/2008 | Sultan |
| 2008/0159309 A1 | 7/2008 | Sultan |
| 2008/0259959 A1 | 10/2008 | Zhai |
| 2008/0267198 A1 | 10/2008 | Sajassi |
| 2009/0168783 A1 | 7/2009 | Mohan |
| 2009/0190504 A1 | 7/2009 | Finn |

OTHER PUBLICATIONS

"IEEE P802.1 ad/D6.0—Virtual Bridged Local Area Networks—Amendment 4: Provider Bridges," Interworking Task Group of IEEE 802.1, Aug. 2005.
Bottorff, P., D. Allan; "Provider Backbone Transport Overview," IEEE 802.1, www.iee802.org, Nov. 2006, pp. 1-5.
Bottorff, P., et al.; "Business Made Simple—Par for Provider Backbone Transport," Jul. 2006.
"IEEE P802.1Q-REV/D4.0—Virtual Bridged Local Area Networks—Revision," Interworking Task Group of IEEE802.1, May 2005.
IEEE P802.1ag/D7.1, Draft Standard for Local and Metropolitan Area Networks—Virtual Bridged Local Area Networks—Amendment 05: Connectivity Fault Management, Nov. 2006.

CONTROL FRAME HANDLING BY A PROVIDER BACKBONE BRIDGE

RELATED APPLICATIONS

This application is a continuation of co-pending U.S. patent application Ser. No. 13/233,110 filed Nov. 15, 2011 which is a continuation of U.S. patent application Ser. No. 12/440,868 filed Oct. 14, 2009, now U.S. Pat. No. 8,036,142, which is a 371 national stage filing of International Application No. PCT/IB2007/003992, filed Dec. 18, 2007, which claims the benefit of U.S. Provisional Application No. 60/884,817, filed Jan. 12, 2007, the disclosures of which are fully incorporated herein by reference.

TECHNICAL FIELD

This invention relates to communication networks. More particularly, and not by way of limitation, the invention is directed to a system, method, and Bridge for handling control frames in a Provider Backbone Bridge Network (PBBN). The method enables frames from a Higher Layer Entity attached to the Bridge to reach an intended entity in the PBBN.

BACKGROUND

The draft IEEE Standard for Local and Metropolitan Area Networks: Virtual Bridged Local Area Networks (IEEE P802.1Q-2006/D0.1) specifies that a VLAN aware Bridge includes a Media Access Control (MAC) Relay Entity that interconnects the Bridge's Ports, at least two Ports, and higher layer entities, including at least a Spanning Tree Protocol Entity. The MAC Relay Entity handles the media access method-independent functions of relaying frames among Bridge Ports, filtering frames, and learning filtering information. The MAC Relay Entity uses the Enhanced Internal Sublayer Service (EISS) provided by each Bridge Port.

Each Bridge Port can also function as an end station providing one or more instances of the MAC Service. Each instance of the MAC Service is provided to a distinct Logical Link Control (LLC) Entity that supports protocol identification, multiplexing, and demultiplexing for PDU transmission and reception by one or more higher layer entities.

Bridges identify Layer 2 Control Protocols (L2CPs) by the "type" field following the MAC addresses in the protocol frames. The destination address of a L2CP frame determines the span of connectivity of the frame and thus to which ports it is delivered. Thus, the relay function within a bridge forwards or filters the frame according to the destination address, regardless of the type. A given protocol only operates on frames containing a "type" field corresponding to that given protocol; however the protocol may also use other criteria to determine what operation, if any, is to be performed. These criteria may include the destination address, VLAN ID, and/or fields within the MAC Service Data Unit (SDU). How these criteria are used in determining how to process a frame is protocol dependent. The determination by the protocol entities of whether or not to process a frame is independent of whether the frame is forwarded or filtered by the relay.

The connectivity of the Higher Layer Entities to the other bridge entities as currently specified in Section 8.5 of IEEE Std 802.1Q, cannot meet the demands required by complex types of ports such as the ports on a Provider Backbone Edge Bridge (BEB). The BEB ports are described in the draft IEEE Standard for Local and Metropolitan Area Networks—Virtual Bridged Local Area Networks—Amendment 06: Provider Backbone Bridges (IEEE P802.1ah/D3.3, December 2006). Frames initiated by or destined to Higher Layer Entities that are attached on a Provider Instance Port (PIP) or a Customer Backbone Port (CBP) would not reach their intended peer entities if they are not properly tagged. In addition, BEBs do not have the capability of tunneling, discarding, or peering the L2CPs initiated by the attached customer networks. Current specifications also fail to provide a mechanism that would allow Higher Layer Entities to communicate over an External Network-to-Network Interface (E-NNI). Enhancements are needed to the Bridge Port Connectivity functionality described in IEEE Standard 802.1Q in order to address these issues.

What is needed in the art is a system, method, and Bridge that helps alleviate the problems associated with the issues outlined above. The present invention provides such a system, method, and Bridge.

SUMMARY

The present invention provides a generic mechanism for tunneling L2CP frames initiated by attached customer networks, and it provides a mechanism that allows Higher Layer Entities to communicate over an E-NNI. The invention provides advanced handling of control frames for customer systems attached to a Provider Backbone Bridge Network (PBBN), and provides a mechanism for exchanging control protocols with operators of other PBBNs.

In one embodiment, the present invention is directed to a method of handling control frames in a Provider Backbone Bridge in a Provider Backbone Bridge Network (PBBN). The method enables frames from a Higher Layer Entity attached alternatively to a Provider Instance Port on an I-Component of a Backbone Edge Bridge or to a Customer Backbone Port on a B-Component of the Backbone Edge Bridge, to reach an intended entity in the PBBN. The method includes the steps of configuring a Virtual Instance Port (VIP) Service Access Point (SAP) for every VIP and every Higher Layer Entity configured on the I-Component; and utilizing the VIP SAP to tunnel customer-initiated Layer 2 Control Protocols (L2CPs). The method also includes the steps of configuring a Special Multiplexed SAP for the frames of the Higher Layer Entity, wherein the Special Multiplexed SAP is assigned a Service Instance ID (I-SID) value that is universally recognized to identify the L2CPs; and utilizing the Special Multiplexed SAP to transfer frames between the Provider Instance Port or the Customer Backbone Port and the entity inside the PBBN.

In another embodiment, the present invention is directed to a Bridge in a PBBN for enabling frames from a Higher Layer Entity attached alternatively to a Provider Instance Port on an I-Component of a Backbone Edge Bridge or to a Customer Backbone Port on a B-Component of the Backbone Edge Bridge, to reach an intended entity in the PBBN. The Bridge includes a VIP SAP configured for every VIP and every Higher Layer Entity configured on the I-Component; and an Enhanced VIP Port Connectivity function for utilizing the VIP SAP to tunnel customer-initiated L2CPs. The Bridge also includes a Special Multiplexed SAP for handling the frames of the Higher Layer Entity, said Special Multiplexed SAP having an I-SID value that is universally recognized to identify the L2CPs; and a Service Instance Multiplex Entity for utilizing the Special Multiplexed SAP to transfer frames between the Provider Instance Port or the Customer Backbone Port and the entity inside the PBBN.

In another embodiment, the present invention is directed to a system in a PBBN for enabling frames from a Higher Layer Entity attached alternatively to a Provider Instance Port on an I-Component of a Backbone Edge Bridge or to a Customer Backbone Port on a B-Component of the Backbone Edge Bridge, to reach an intended entity in the PBBN. The system includes a plurality of interconnected Bridges, each of which includes at least two ports, a Media Access Control (MAC) Relay Entity that interconnects the Bridge's ports, and at least one Higher Layer Entity. Each Bridge also includes a VIP SAP configured for every VIP and every Higher Layer Entity configured on the I-Component, and an Enhanced VIP Port Connectivity function for utilizing the VIP SAP to tunnel customer-initiated L2CPs. Each Bridge also includes a Special Multiplexed SAP for handling the frames of the Higher Layer Entity, wherein the Special Multiplexed SAP is assigned an I-SID value that is universally recognized to identify the L2CPs. A Service Instance Multiplex Entity utilizes the Special Multiplexed SAP to transfer frames between the Provider Instance Port or the Customer Backbone Port and the entity inside the PBBN.

BRIEF DESCRIPTION OF THE DRAWINGS

In the following, the essential features of the invention will be described in detail by showing preferred embodiments, with reference to the attached figures in which.

DETAILED DESCRIPTION

The present invention enables Higher Layer Entities attached to a Provider Instance Port on an I-Component, or to a Customer Backbone Port on a B-Component, to reach intended entities in a Provider Backbone Bridged Network. In particular, the present invention achieves the tunneling of customer-initiated L2CPs by introducing a Virtual Instance Port (VIP) Service Access Point (SAP) for every VIP and every Higher Layer Entity configured on the I-Component. The invention achieves the communication of a PIP or a CBP with an entity inside the PBBN by utilizing a Special Multiplexed SAP, which is assigned a specific Service Instance ID (I-SID) value, for example 0xFFFFFF.

An I-Component is a component of a BEB which performs encapsulation/decapsulation of Provider Bridge frames. An I-Component is located at the edge of a PBBN. It consists of an S-VLAN-aware bridge component where each IEEE802.1 Customer Instance Port can recognize service VLAN tags (STAGs) and where each IEEE802.1 PIP can encapsulate/decapsulate frames inside an Ethernet frame which uses backbone MAC addresses and a Service Instance TAG (I-TAG). A B-Component is a component of a BEB which performs frame forwarding over a PBBN. A B-Component is located at the edge of a PBBN. It consists of an S-VLAN-aware bridge component where each IEEE802.1 Provider Backbone Port can recognize backbone VLAN tags (B-TAGs).

Two sets of Higher Layer SAPs are configured on a PIP: (1) a VIP SAP is provided for every Higher Layer Entity and every VIP port on the I-Component; and (2) a Special Multiplexed SAP is provided for frames of Higher Layer entities that are initiated by a PIP on an I-component or a CBP on a B-component and are required to reach a device inside the PBBN. The VIP SAPs are actually related to the Virtual Instance Ports internal to the PIP, while the Special Multiplexed SAPs are also applicable to the Customer Backbone Ports on a B-Component.

Figure 1:
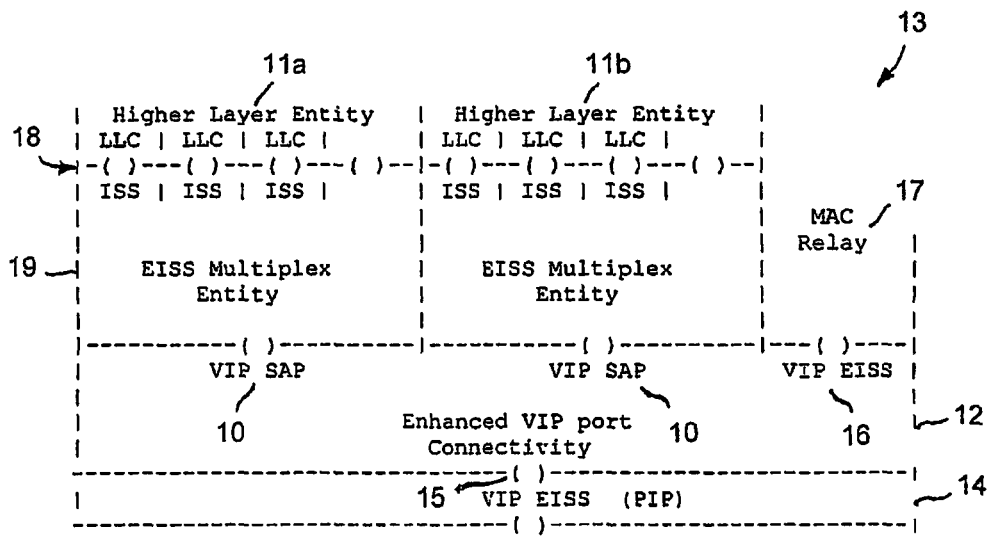
FIG. 1 illustrates an exemplary embodiment of the present invention when providing a VIP SAP for two Higher Layer Entities and for an Enhanced VIP Port Connectivity function on an I-Component.

FIG. 1 illustrates an exemplary embodiment of the present invention when providing a VIP SAP 10 for two Higher Layer Entities 11a, 11b and for an Enhanced VIP Port Connectivity function 12 on an I-Component 13. Frames of Higher Layer Entities that are initiated by a PIP 14 and are required to reach Customer Networks placed on the opposite side of an intervening PBBN are encapsulated in the same way as data frames. An example of such a usage is that of Provider Bridged BPDUs that are transmitted transparently through the PBBN. The Enhanced VIP Port Connectivity function 12 provides multiple copies of each frame destined to the VIP: one copy for the EISS and one copy for each Higher Layer Entity attached to the VIP.

Each Indication provided by the VIP EISS access point 15 for the PIP 14 results in a corresponding Indication with identical parameters at a VIP EISS 16 supporting a MAC Relay Entity 17 and the VIP SAPs 10 supporting the Higher Layer Entities 11a, 11b. Each Request from the VIP EISS access point 16 supporting the MAC Relay Entity results in a corresponding Indication with identical parameters at the VIP SAP access points 10 for the Higher Layer Entities and in a corresponding Request with identical parameters at the VIP EISS access point 15 for the PIP. Each Request from the VIP SAP access point 10 supporting a Higher Layer Entity results in a corresponding Indication with identical parameters at the VIP EISS access point 16 for the MAC Relay Entity, and at other access points for Higher Layer Entities, and in a corresponding Request with identical parameters at the access point for the LAN 15.

Frames injected from the LLC Higher Layer SAPs 18 that are S-VLAN untagged utilize a EISS Multiplex Entity 19 as described in the corresponding subclause of the draft IEEE Standard for Local and Metropolitan Area Networks—Virtual Bridged Local Area Networks—Amendment 05: Connectivity Fault Management (IEEE P802.1ag/D7.1, November 2006).

Figure 2:
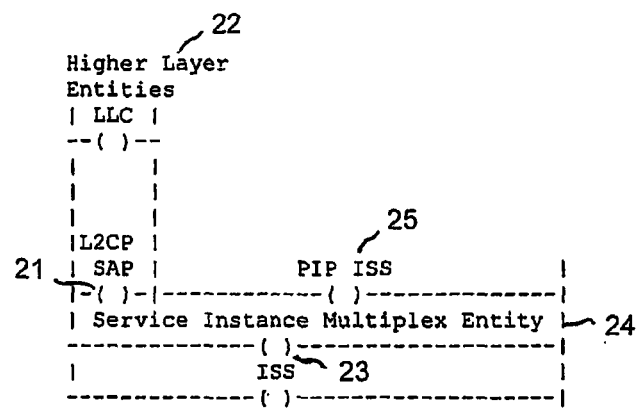
FIG. 2 illustrates an exemplary embodiment of the present invention when providing a Special Multiplexed SAP for frames of Higher Layer Entities that are initiated by a PIP on an I-component or a CBP on a B-component and are required to reach a device inside a PBBN.

FIG. 2 illustrates an exemplary embodiment of the present invention when providing a Special Multiplexed SAP 21 for frames of Higher Layer Entities 22 that are initiated by a PIP on an I-component or a CBP on a B-component and are required to reach a device inside the PBBN. Each Special Multiplexed SAP is assigned an I-SID value that is universally recognized to identify the Layer 2 Control Protocols (L2CPs), for example I-SID 0xFFFFFF. Upon receipt of an Indication from an ISS SAP 23, a Service Instance Multiplex Entity 24 examines the initial octets of the mac_service_data_unit parameter for a valid service instance tag header. If the initial octets contain a valid short service instance tag 10' header and the I-SID value matches the value assigned to the multiplexed SAPs for L2CPs, then this tag header is removed from the mac_service_data_unit and the Indication is presented to the L2CP SAP 21. Otherwise the Indication is presented unmodified to the single PIP ISS SAP 25.

Upon receipt of a Request from the L2CP SAP 21, the Service Instance Multiplex Entity 24 modifies the mac_service_data_unit parameter by prepending a short service instance tag header using the I-SID value assigned (for example, 0xFFFFFF). The Request is then presented to the single ISS SAP 23 of the Service Instance Multiplex Entity. A Request or Indication received from the PIP ISS SAP 25 is presented unmodified to the single ISS SAP 23.

In this manner, the present invention provides a generic mechanism for tunneling L2CP frames initiated by attached customer networks, and it provides a mechanism that allows Higher Layer Entities to communicate over an External Network-to-Network Interface. The invention provides advanced handling of control frames for customer systems attached to a Provider Backbone Bridge Network, and provides a mechanism for exchanging control protocols with operators of other PBBNs.

Figure 3:
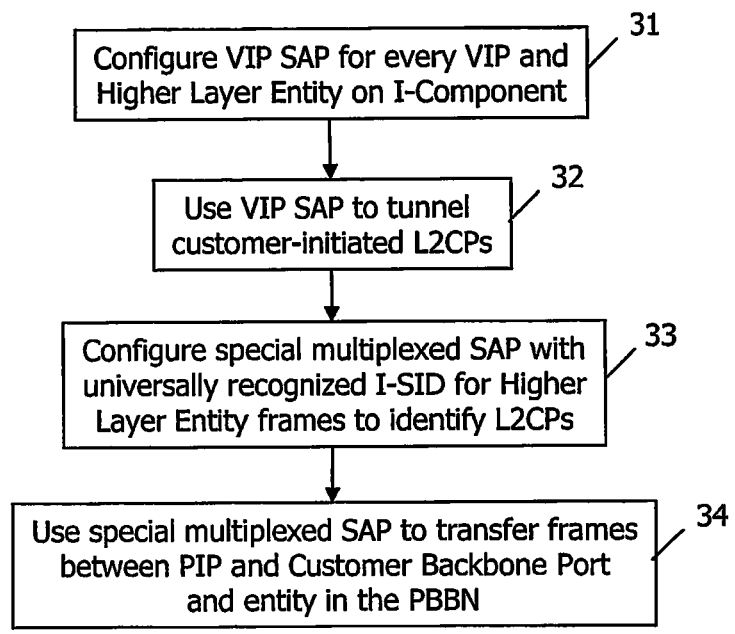
FIG. 3 is a flow chart of an exemplary embodiment of the method of the present invention.

FIG. 3 is a flow chart of an exemplary embodiment of the method of the present invention. At step 31, a VIP SAP 10 is configured for every VIP and Higher Layer Entity 11a, 11b, 22 on the I-Component 13. At step 32, the VIP SAP is utilized to tunnel customer-initiated L2CPs. At step 33, a Special Multiplexed SAP is configured with a universally recognized I-SID for Higher Layer Entity frames to identify L2CPs. At step 34, the Special Multiplexed SAP is utilized to transfer frames between the PIP and Customer Backbone Port and the entity in the PBBN.

Although preferred embodiments of the present invention have been illustrated in the accompanying drawings and described in the foregoing Detailed Description, it is understood that the invention is not limited to the embodiments disclosed therein, but is defined by the following claims.

The invention claimed is:

1. A method of handling control frames in a Provider Backbone Bridge in a Provider Backbone Bridge Network (PBBN), said method enabling frames from a Higher Layer Entity attached alternatively to a Provider Instance Port (PIP) on an I-Component of a Backbone Edge Bridge or to a Customer Backbone Port on a B-Component of the Backbone Edge Bridge, to reach an intended entity in the PBBN, said method comprising the steps of:
configuring a Multiplexed Service Access Point (SAP) of a Service Instance Multiplex Entity for the frames of the Higher Layer Entity, said Multiplexed SAP having a Service Instance ID (I-SID) value that is universally recognized to identify Layer 2 Control Protocols (L2CPs); and
utilizing the Service Instance Multiplex Entity to transfer frames of L2CPs between the PIP or the Customer Backbone Port and the intended entity in the PBBN.

2. The method as recited in claim 1, further comprising the steps of:
configuring a Virtual Instance Port Service Access Point (VIP SAP) for every VIP and every Higher Layer Entity configured on the I-Component; and
utilizing the VIP SAP to tunnel customer-initiated L2CPs.

3. The method as recited in claim 2, wherein the step of utilizing the VIP SAP to tunnel customer-initiated L2CPs includes the steps of:
encapsulating the frames of the Higher Layer Entity that are initiated by the PIP and are required to reach Customer Networks placed on an opposite side of the PBBN; and
providing multiple copies of each frame destined to the VIP, wherein one copy is provided for the Enhanced Internal Sublayer Service (EISS) provided by each Bridge Port, and one copy is provided for each Higher Layer Entity attached to the VIP.

4. The method as recited in claim 3, wherein the step of utilizing the VIP SAP to tunnel customer-initiated L2CPs also includes the steps of:
receiving by an Enhanced VIP Port Connectivity function, an Indication from a VIP EISS access point for the PIP; and
in response to the Indication, providing by the Enhanced VIP Port Connectivity function, a corresponding Indication with identical parameters at a VIP EISS supporting a MAC Relay Entity and the VIP SAP supporting the Higher Layer Entity.

5. The method as recited in claim 4, wherein the step of utilizing the VIP SAP to tunnel customer-initiated L2CPs also includes the steps of:
receiving by the Enhanced VIP Port Connectivity function, a Request from the VIP EISS supporting a MAC Relay Entity; and
in response to the Request:
providing by the Enhanced VIP Port Connectivity function, a corresponding Indication with identical parameters at the VIP SAP supporting the Higher Layer Entity; and
providing by the Enhanced VIP Port Connectivity function, a corresponding Request with identical parameters at the VIP EISS access point for the PIP.

6. The method as recited in claim 5, wherein the step of utilizing the VIP SAP to tunnel customer-initiated L2CPs also includes the steps of:
receiving by the Enhanced VIP Port Connectivity function, a Request from the VIP SAP supporting the Higher Layer Entity; and
in response to the Request:
providing by the Enhanced VIP Port Connectivity function, a corresponding Indication with identical parameters at the EISS access point for the MAC Relay Entity;
providing by the Enhanced VIP Port Connectivity function, a corresponding Indication with identical parameters at any VIP SAPs supporting other Higher Layer Entities; and
providing by the Enhanced VIP Port Connectivity function, a corresponding Request with identical parameters at the access point for a local area network (LAN).

7. The method as recited in claim 1, wherein the step of utilizing the Service Instance Multiplex Entity to transfer frames includes the steps of:
receiving by the Service Instance Multiplex Entity, an Indication from an Internal Sublayer Service (ISS) SAP; and
determining by the Service Instance Multiplex Entity, whether the initial octets of a mac_service_data_unit parameter include a valid service instance tag header;
if the initial octets include a valid service instance tag header:
removing the tag header from the mac_service_data_unit; and
providing the Indication to a L2CP SAP; and
if the initial octets do not include a valid service instance tag header, providing the Indication unmodified to a PIP ISS SAP.

8. The method as recited in claim 7, wherein the step of utilizing the Service Instance Multiplex Entity to transfer frames also includes the steps of:
receiving by the Service Instance Multiplex Entity, a Request from the L2CP SAP;
modifying the mac_service_data_unit parameter by prepending a short service instance tag header using the I-SID value assigned to the Special Multiplexed SAP; and
providing the Request to the ISS SAP of the Service Instance Multiplex Entity.

9. The method as recited in claim 8, wherein the step of utilizing the Service Instance Multiplex Entity to transfer frames also includes the steps of:

receiving by the Service Instance Multiplex Entity, a Request or Indication from the PIP ISS SAP; and
providing the Request or Indication unmodified to the ISS SAP.

10. A Bridge in a Provider Backbone Bridge Network (PBBN) for enabling frames from a Higher Layer Entity attached alternatively to a Provider Instance Port (PIP) on an I-Component of a Backbone Edge Bridge or to a Customer Backbone Port on a B-Component of the Backbone Edge Bridge, to reach an intended entity in the PBBN, said Bridge comprising:
a Multiplexed Service Access Point (SAP) of a Service Instance Multiplex Entity for handling the frames of the Higher Layer Entity, said Multiplexed SAP having a Service Instance ID (I-SID) value that is universally recognized to identify Layer 2 Control Protocols (L2CPs); and
wherein the Service Instance Multiplex Entity is configured to utilize the Multiplexed SAP to transfer frames of L2CPs between the PIP or the Customer Backbone Port and the intended entity in the PBBN.

11. The Bridge as recited in claim 10, further comprising:
a Virtual Instance Port Service Access Point (VIP SAP) configured for every VIP and every Higher Layer Entity configured on the I-Component; and
an Enhanced VIP Port Connectivity function for utilizing the VIP SAP to tunnel customer-initiated L2CPs.

12. The Bridge as recited in claim 11, wherein the Enhanced VIP Port Connectivity function is configured to:
encapsulate the frames of the Higher Layer Entity that are initiated by the PIP and are required to reach Customer Networks placed on an opposite side of the PBBN; and
provide multiple copies of each frame destined to the VIP, wherein one copy is provided for the Enhanced Internal Sublayer Service (EISS) provided by each Bridge Port, and one copy is provided for each Higher Layer Entity attached to the VIP.

13. The Bridge as recited in claim 12, wherein the Enhanced VIP Port Connectivity is also configured to:
receive an Indication from a VIP EISS access point for the PIP; and
responsive to receiving the Indication, provide a corresponding Indication with identical parameters at a VIP EISS supporting a MAC Relay Entity and the VIP SAP supporting the Higher Layer Entity.

14. The Bridge as recited in claim 13, wherein the Enhanced VIP Port Connectivity function is also configured to:
receive a Request from the VIP EISS supporting a MAC Relay Entity; and
responsive to the Request:
provide a corresponding Indication with identical parameters at the VIP SAP supporting the Higher Layer Entity; and
provide a corresponding Request with identical parameters at the VIP EISS access point for the PIP.

15. The Bridge as recited in claim 14, wherein the Enhanced VIP Port Connectivity function is also configured to:
receive a Request from the VIP SAP supporting the Higher Layer Entity; and
responsive to the Request:
provide a corresponding Indication with identical parameters at the EISS access point for the MAC Relay Entity;
provide a corresponding Indication with identical parameters at any VIP SAPs supporting other Higher Layer Entities; and
provide a corresponding Request with identical parameters at the access point for a local area network (LAN).

16. The Bridge as recited in claim 10, wherein the Service Instance Multiplex Entity is configured to:
receive an Indication from an Internal Sublayer Service (ISS) SAP;
determine whether the initial octets of a mac_service_data_unit parameter include a valid service instance tag header;
responsive to a determination that the initial octets include a valid service instance tag header:
remove the tag header from the mac_service_data_unit; and
provide the Indication to a L2CP SAP; and
responsive to a determination that the initial octets do not include a valid service instance tag header, provide the Indication unmodified to a PIP ISS SAP.

17. The Bridge as recited in claim 10, wherein the Service Instance Multiplex Entity is configured to:
receive a Request from the L2CP SAP;
modify the mac_service_data_unit parameter by prepending a short service instance tag header using the I-SID value assigned to the Special Multiplexed SAP; and
provide the Request to the ISS SAP of the Service Instance Multiplex Entity.

18. The Bridge as recited in claim 10, wherein the Service Instance Multiplex Entity is configured to:
receive a Request or Indication from the PIP ISS SAP; and
provide the Request or Indication unmodified to the ISS SAP.

19. A system in a Provider Backbone Bridge Network (PBBN) for enabling frames from a Higher Layer Entity attached alternatively to a Provider Instance Port (PIP) on an I-Component of a Backbone Edge Bridge or to a Customer Backbone Port on a B-Component of the Backbone Edge Bridge, to reach an intended entity in the PBBN, said system comprising:
a plurality of interconnected Bridges, each Bridge including:
at least two ports;
a Media Access Control (MAC) Relay Entity that interconnects the Bridge's ports;
at least one Higher Layer Entity; and
a Service Instance Multiplex Entity that includes a Multiplexed Service Access Point (SAP) for handling the frames of the Higher Layer Entity, said Multiplexed SAP having a Service Instance ID (I-SID) value that is universally recognized to identify Layer 2 Control Protocols (L2CPs), wherein the Service Instance Multiplex Entity is configured to utilize the Multiplexed SAP to transfer frames of L2CPs between the PIP or the Customer Backbone Port and the intended entity in the PBBN.

20. The system as recited in claim 19, wherein each bridge also includes:
a Virtual Instance Port Service Access Point (VIP SAP) configured for every VIP and every Higher Layer Entity configured on the I-Component; and
an Enhanced VIP Port Connectivity function configured to utilize the VIP SAP to tunnel customer-initiated L2CPs.

* * * * *

UNITED STATES PATENT AND TRADEMARK OFFICE
CERTIFICATE OF CORRECTION

Page 1 of 1

PATENT NO. : 9,124,468 B2
APPLICATION NO. : 13/856576
DATED : September 1, 2015
INVENTOR(S) : Saltsidis It is certified that error appears in the above-identified patent and that said Letters Patent is hereby corrected as shown below:

In the Specification

In Column 1, Line 6, delete "co-pending".

In Column 1, Lines 20-24, delete "Bridge for handling control frames in a Provider Backbone Bridge Network (PBBN). The method enables frames from a Higher Layer Entity attached to the Bridge to reach an intended entity in the PBBN." and insert the same at Line 20, after "and" as a continuation Paragraph.

In Column 4, Line 32, delete "LAN 15." and insert -- LAN. --, therefor.

In Column 4, Line 51, delete "tag 10'" and insert -- tag --, therefor.

In the Claims

In Column 6, Line 58, in Claim 8, delete "SAP," and insert -- SAP; --, therefor.

Signed and Sealed this
Fifth Day of July, 2016

Michelle K. Lee
*Director of the United States Patent and Trademark Office*